Figure 2:
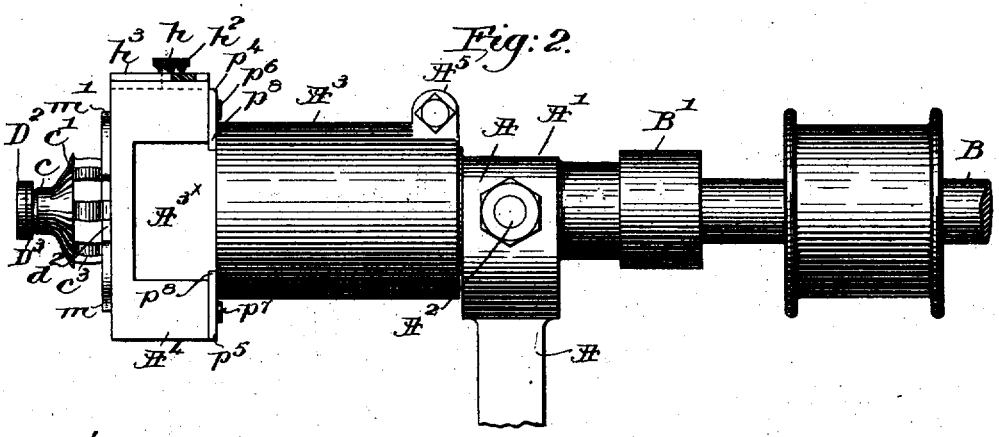

No. 11,770. Reissued Sept. 5, 1899.

B. F. MAYO.

HEEL TRIMMING MACHINE.

(Application filed Feb. 6, 1899.)

3 Sheets—Sheet 1.

Witnesses,
Edward F. Allen
James M. Ingraham

Inventor;
Benjamin F. Mayo,
by Crosby & Gregory.
Attys.

THE NORRIS PETERS CO., PHOTO-LITHO., WASHINGTON, D. C.

No. 11,770. Reissued Sept. 5, 1899.

B. F. MAYO.

HEEL TRIMMING MACHINE.

(Application filed Feb. 6, 1899.)

3 Sheets—Sheet 2.

Witnesses,
Edward H. Allen.
James M. Elquhart.

Inventor,
Benjamin F. Mayo,
by Crosby & Gregory.
Atty's.

THE NORRIS PETERS CO., PHOTO-LITHO., WASHINGTON, D. C.

No. 11,770. Reissued Sept. 5, 1899.

B. F. MAYO.

HEEL TRIMMING MACHINE.

(Application filed Feb. 6, 1899.)

3 Sheets—Sheet 3.

Witnesses,
Edward F. Allen.
Thomas J. Drummond

Inventor,
Benjamin F. Mayo,
by Crosby & Gregory
atty's.

THE NORRIS PETERS CO., PHOTO-LITHO., WASHINGTON, D. C.

UNITED STATES PATENT OFFICE.

BENJAMIN F. MAYO, OF SALEM, MASSACHUSETTS, ASSIGNOR, BY MESNE ASSIGNMENTS, TO THE McKAY SHOE MACHINERY COMPANY, OF BOSTON, MASSACHUSETTS.

HEEL-TRIMMING MACHINE.

SPECIFICATION forming part of Reissued Letters Patent No. 11,770, dated September 5, 1899.

Original No. 609,518, dated August 23, 1898. Application for reissue filed February 6, 1899. Serial No. 704,748.

*To all whom it may concern:*

Be it known that I, BENJAMIN F. MAYO, a citizen of the United States, residing at Salem, county of Essex, State of Massachusetts, have invented an Improvement in Heel-Trimming Machines, of which the following description, in connection with the accompanying drawings, is a specification, like letters and figures on the drawings representing like parts.

This invention has for its object the production of a novel machine for trimming heels on boots and shoes, my invention being especially adapted to trimming what are known as "spring-heels."

In my improved machine the cutter, which has a series of blades shaped to conform to the requirements of the heel, has coöperating with it a rotary rest, against which the edge of the sole lying without the heel to be trimmed bears during the trimming operation, said rest being composed of a rotatable ring or collar having a series of projections which enter the spaces between the blades of the rotary cutter and rotate in unison with the said cutter. The cutter is free to move laterally with relation to this rest and parallel with the axis of the driving-shaft to thus enable the cutter to adapt itself to the different thicknesses of the heel being trimmed, the cutter yielding in either direction as the heel varies in thickness.

With a spring-heel the thickness of the leather interposed between the outer and the inner sole varies, it decreasing in thickness at the shank, and to trim this material of least thickness and while doing so obviate cutting injuriously into the edge of the outer sole at the shank I have combined with the said cutter and rest two edge-guides, one being located at one and the other at the opposite side of the cutter, said edge-guides being so located as to temporarily furnish an auxiliary support for the sole outside the heel portion just for the period of time that the cutter is starting to trim the portion of the heel of least thickness or at what in spring-heels is sometimes called the "scarf," the rotation of the heel under the cutter as the latter acts to trim the round part of the heel removing the sole from contact with the said guide, thus letting only the rotary rest act to position the sole. The rotary rest has an annular or ring-like surface which bears against the outer face of the sole at its edge and keeps the said edge smooth, and but for this ring-like surface the edge might be rough, so I have called this surface a "feather-edger." The sole of the spring-heel shoe is placed on a sole-support, the same being a plate adjustably held alongside of the rotary cutter. The operator presses the tread-face of the heel end of the sole against this support and the edge of the sole against the rest, and as the heel is trimmed he turns the tread-face of the sole about on this support, keeping, however, the edge of the sole against the rotating rest. This support may be placed or adjusted to occupy a more or less angular position with relation to the axis of rotation of the cutter, so that the edge of the heel may be more or less inclined, as may be desired by the particular manufacturers who are to use the machine. The sole-support may also be adjusted bodily back and forth to thus adapt the machine to trimming heels which are convexed or made thicker in the median line of the sole.

Figure 1:
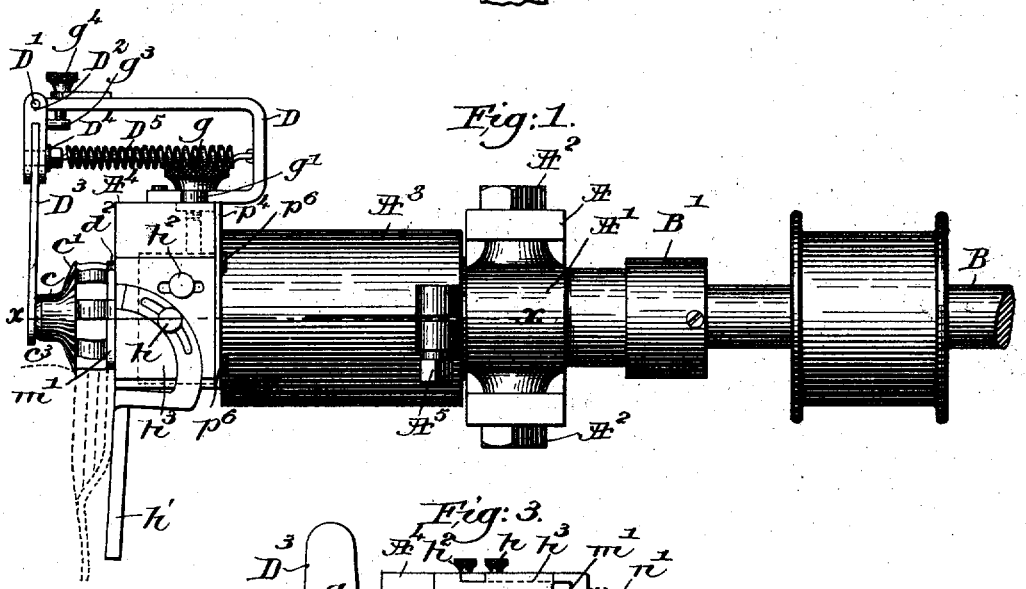
Figure 3:
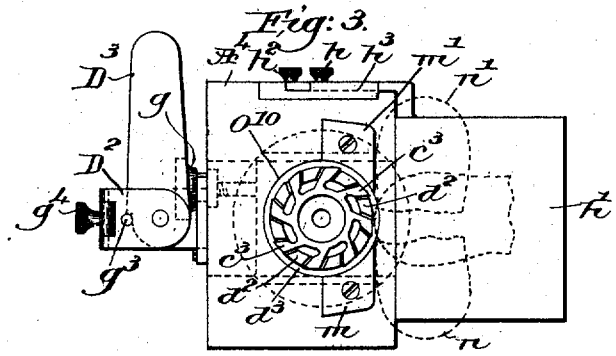
Figure 4:
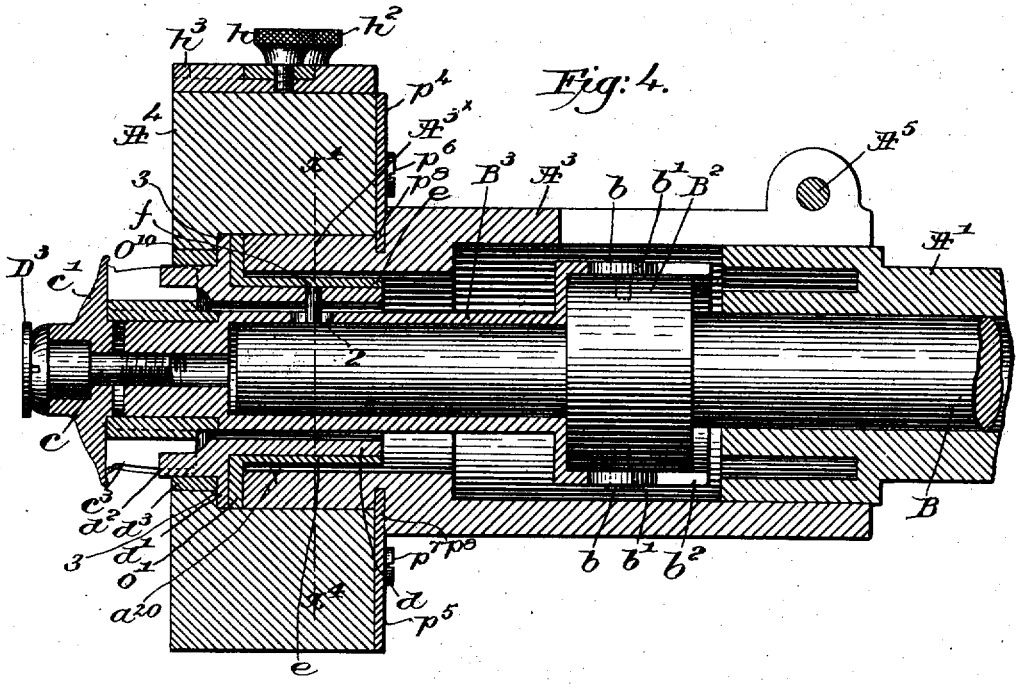
Figure 5:
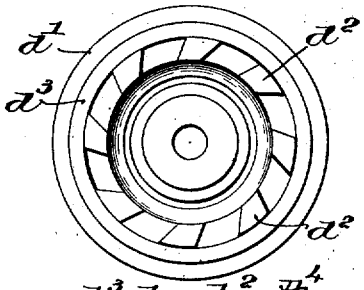
Figure 6:
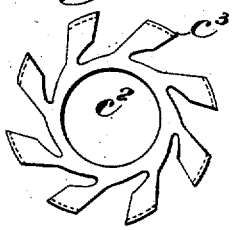
Figure 7:
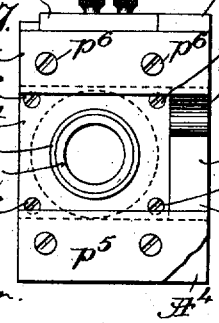
Figure 8:
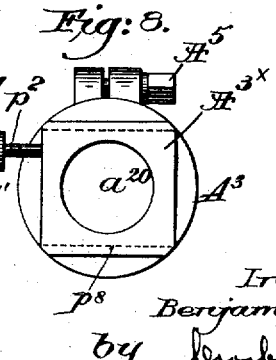
Figure 9:
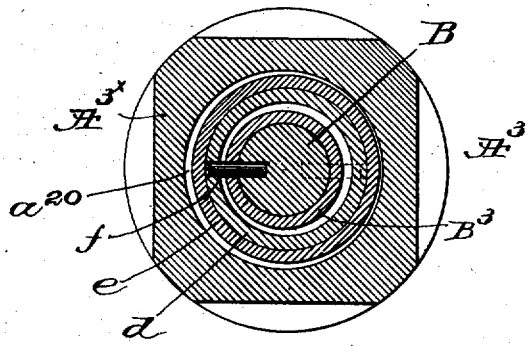
Figure 10:
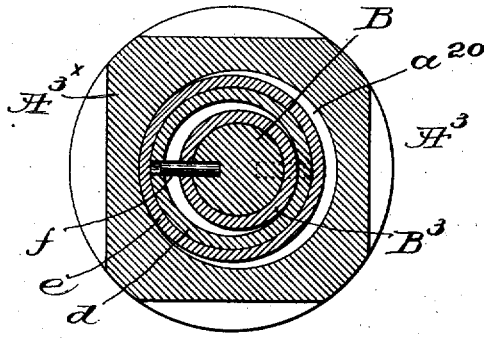

Figure 1 represents a top or plan view of a sufficient portion of a heel-trimming machine containing my improvements to enable my invention to be understood. Fig. 2 is a right-hand side elevation of the apparatus shown in Fig. 1 with the heel-support removed. Fig. 3 is a front elevation of the parts shown in Fig. 1. Fig. 4 is an enlarged vertical section in the line $x$, Fig. 1. Fig. 5 is an enlarged face view of the rotating rest and feather-edger. Fig. 6 is a face view of the cutter employed. Fig. 7 is an inner end elevation of the head and the bearing for the rotary rest. Fig. 8 is a detail of the front end of the box $A^3$. Fig. 9 is a section in the line $x^4$, Fig. 4; and Fig. 10 is a like section with the cutter-actuating head adjusted for a smaller cutter.

I have not herein considered it necessary to show any considerable portion of the frame work of the machine, as that may be of any usual or suitable construction. I have shown, however, a portion A of the framework, it receiving a bearing-box A′, which is pivotally mounted therein by or through the point-screws $A^2$, the forward or left-hand end of said bearing-box having clamped upon it a slotted hollow box $A^3$, the said hollow box constituting a bearing for the head $A^4$, to be described, it also inclosing within it other parts. This hollow box is held in position by means of a clamp-screw $A^5$, entering ears of the hollow box, the said hollow box being split, as shown in Fig. 1, so that by said screw the said hollow box is clamped firmly upon the bearing-box. The shaft B, having suitable bearings in the usual framework, is also extended through the bearing-box A′, and the said shaft, at the rear or right-hand end of the bearing-box, has fast upon it a collar B′, which thus positions the shaft longitudinally with relation to the other parts of the machine.

The shaft B is shown as provided with a solid collar $B^2$, upon which, in this present instance, I have secured by suitable screws, as $b$, rollers $b'$, which enter slots $b^2$ in a sleeve $B^3$, suitably shaped to embrace said collar and also the prolonged left-hand end of the shaft B, the said sleeve being provided at its outer end with a tapped hole to receive a stud-screw $c$, the said stud-screw passing centrally through a rand-gage $c'$ and through the central opening $c^2$ (see Fig. 6) of the cutter $c^3$, said stud-screw thus confining the cutter upon the said sleeve. The sleeve has a shoulder against which the rear edge of the hub of the cutter bears, while the front edge of the hub of the cutter is acted upon by the interior face of the rand-guide. The sleeve constitutes a driver for the cutter, the sleeve being driven by or through the rollers or projections $b'$, attached to the shaft B. Coöperating with this cutter, the teeth of which may be of any usual or suitable shape, I employ a rotary rest, it being shown detached in Fig. 5. This rotary rest consists, essentially, of a hollow hub $d$, (shown in section in Fig. 4,) said hub entering a cylindrical box or bearing $e$.

The hollow hub $d$ has, as shown, a laterally-projecting flange $d$, and projecting from the end of the hub beyond the said flange are a series of rests $d^2$, a rest for every space between the teeth of the cutter, said rests entering loosely when in operative position the spaces between the blades of the said cutter, as shown in Fig. 3. These rests $d^2$ consist of a series of fingers extended in between the blades of the cutter. The acting edges of said fingers standing substantially parallel to the axis of rotation of the said cutter are surrounded externally at a short distance back from their ends (see Figs. 4 and 5) with a plain metallic ring $d^3$, said ring being preferably driven snugly onto said rests, so that it practically becomes a part of the rest and rotates with it and the cutter. The outer edge of this ring or feather-edger presents a shoulder which stands a little way back from the ends of the rests and projects from said rests at substantially a right angle, said feather-edger always bearing against the corner of the sole while the heel is being trimmed by the blades of the cutter, the edge of said sole being normally kept pressed against the rests as they rotate with the cutter.

In the manufacture of shoes having spring-heels the heel of the outer sole is died out to pattern, and the lifts constituting the heel are put in between this died-out outer sole and upper embracing the inner sole. Sometimes this outer sole does not need to be trimmed, being of proper shape as died out; but when it is not died out to just the shape desired, or when it is not placed accurately on the heel, it is necessary to adjust the machine so that the sole will be trimmed somewhat while the heel is being trimmed. Then the rests $d^2$ will be so adjusted with relation to the path in which the blades of the cutter travel that the sole will be trimmed as the body or lifts of the heel are being trimmed, the feather-edger at such time by its pressure against the corner of the sole close up to the line of trimming preventing the throwing out or formation of a feather-line or rough edge at the corner of the sole. When, however, the sole does not need to be trimmed, the rests $d^2$ will be so adjusted with relation to the path in which the blades of the cutter rotate that the cutter will not cut the edge of the sole bearing against the rests $d^2$, and at such time the feather-edger merely supports the corner of the sole and is not operative, for the reason that the sole is not then being acted upon by the cutter, and consequently no rough edge is formed. To drive this rotary rest in unison with the cutter and relieve the cutter from the duty of actuating it, I have provided the shaft with a pin $f$, which is extended out through a short slot 2 (see Fig. 4) in the sleeve $B^3$, said pin entering a hole in the hub constituting part of the rest, so that said hub is rotated in the surrounding bearing $e$, and to permit the cutter while the edge of the rand-guide rests in the space between the sole and the upper or between the spring-heel and the upper to adapt itself to the thickness of the heel or that part between the sole and the upper I have provided the slot 2 and the extra slots $b^2$.

To insure the holding of the cutter in its normal position—that is, for a heel of average thickness—I have added to the head a yoke D, upon which is pivoted at D′ a holder $D^2$, said holder having in turn pivoted upon it a presser plate or finger $D^3$, the pivot being represented at $D^4$, a suitable spring $D^5$ (shown in Fig. 1) normally acting to keep the holder or finger pressed against the stud-screw $c$; but when the heel being trimmed increases in thickness the cutter, by or through the action of the rand-guide in the crease, may be pulled or drawn out to the left, viewing Fig. 1, and at such time the tension of the spring $D^5$ has to be overcome.

The finger $D^3$ when desired may be kept in elevated position, as shown in Fig. 3—as when, for instance, the cutter is to be removed, the finger being then turned up, a shoulder on the finger meeting the stud $g^3$ on the holder $D^2$.

To adjust the finger to cutters of different thicknesses, the stud $g^3$ is prolonged to act against a screw $g^4$ in the yoke D.

Upon one side of the head $A^4$—viz., the right-hand side, as shown in the drawings—I have attached, by a suitable screw, as $h$, a sole-support $h'$ to support the tread-face of the sole at its heel end, its outer face occupying a position (see Fig. 1) more or less inclined with relation to the axis of rotation of the cutter, so that by changing the position of said sole-support the edge of the spring-heel may be inclined more or less. I have shown this sole-support as having an arm provided with a curved slot through which is extended the screw $h$, which holds said support stationary while the heel is being trimmed.

In some cases the tread-face of the heel end of the sole-covering lifts forming the spring-heel is convexed, so as to give the heel a greater thickness in the median line of the sole, and to adapt this sole-support to this class of heels the face of the support must be carried backwardly or to the right, viewing Fig. 1, and to effect this purpose I may slacken the screw $h^2$ and move longitudinally with relation to the shaft B the small plate $h^3$, to which the arm of the sole-support is attached by the screw $h$.

Upon the face of the head (see Fig. 3) I have placed the auxiliary support before mentioned, shown as two guides $m\,m'$, one being at one and the other at the opposite side of the rotary cutter, they in no way obstructing or covering the edges of the cutters which act upon the sole, with one or the other of said guides supporting the edge of the sole being trimmed adjacent to the point at which the trimming is taking place to thus assist in governing the depth of the cut.

A shoe having a heel to be trimmed is taken by the operator and the tread-face of the outer sole at the heel part is put against the sole-support $h'$, (see dotted line $n$,) the shoe standing substantially vertical, viewing Fig. 3, with the toe of the shoe uppermost, the edge of the outer sole at its junction with the scarf standing against the auxiliary support—in this instance the guide $m$—while the scarf is being trimmed. The scarf having been trimmed, the shoe will be further moved vertically, and in so doing the outer face of the sole, near its edge, will come upon the face of the feather-edger and the edge of the sole will come against the rests $d^2$, one after another, as the cutter and rest rotate, and this operation of trimming the heel is continued, the shoe being rotated on the support until the toe of the shoe points substantially downward in the dotted-line position $n'$, when the movement of the shoe is again vertical, but with the heel upward, and when the shoe is sufficiently elevated to bring the scarf part of the sole again in position to be trimmed, together with the small beveled end of the heel, the edge of the sole comes again against the auxiliary support, this time against the guide $m'$. During this trimming operation the rests $d^2$ work one after another and form a perfect support against which the edge of the sole may travel.

This invention is not limited to the exact construction shown of the several devices, as the construction might be varied by the skill of a mechanic and without invention and yet perform the results hereinbefore referred to.

The head $A^4$ (shown in section, Fig. 4, in place and at its rear side, Fig. 7, detached from the shaft B) has a horizontal slot $o$ to fit and be slid or adjusted somewhat horizontally on the squared end $A^{3\times}$ of the stationary hollow box $A^3$. The face of the head $A^4$ is provided with a hole $o^{10}$, which intersects the horizontal slot $o$, said hole receiving, embracing loosely, and constituting a bearing for the ring-like feather-edger $d^3$, which may be forced snugly on the rest $d^2$ back against its circular flange or projection $d'$. The left-hand end, viewing Fig. 4, of the rest $d^2$ and the feather-edger is put in the slot $o$ and inserted through the hole $d^{10}$, and the circular flange $d'$ of the said rest is put in contact with the bottom 3 of the slot $o$ about the junction of the hole $o^{10}$ with the slot $o$. The shank $d$ of the rest is surrounded loosely by a bearing $e$, having at one end an oblong flange $o'$, the outer face or side of which is placed against the rear side of the circular flange $d'$ of the rest, and the corners of said flange $o'$ receive suitable screws $o^2$, which enter threaded holes in the bottom 3 of the slot $o$, (see Fig. 7,) leaving the shank $d$ of the rest free to be rotated in the sleeve of the said bearing $e$ and the flange $d'$ of the rest free to turn in the space between the bottom 3 of the slot $o$ and the outer face of the flange $o'$ of said bearing. The external diameter of the sleeve of the bearing $e$ is less than the diameter of the hole $a^{20}$ in the squared hub $A^{3\times}$, into which hole $a^{20}$ the said sleeve is entered.

The hollow box $A^3$ at the junction of the squared part $A^{3\times}$ with its circular part is provided with two parallel grooves $p^3$, (see full lines, Fig. 4, and dotted lines, Figs. 7 and 8,) in which is entered the edges of two gibs $p^4$ and $p^5$, connected with the inner face of the head $A^4$ by suitable screws $p^6\,p^7$, leaving the head $A^4$ so applied to the squared end $A^{3\times}$ of the sliding box free to be adjusted thereon horizontally with relation to the center of rotation of the shaft B.

The part $A^{3\times}$ of the hollow box has fixed to it a screw $p^2$, and said screw receives upon it an adjusting-nut $g$, having an annular groove $g'$, which is entered by a portion of the yoke D, and by rotating said nut when the said yoke stands in the said groove the said nut, acting on the screw $p^2$ and turning in the hole $p$ of the head, the said head, together with the bearing $e$, containing the shank of the rest $d^2$ and the feather-edger $d^3$, are adjusted with relation to the shaft B to compensate for the wear of the cutter due to grinding.

The flange $o'$ of the bearing $e$ being secured to the head $A^4$ by screws $o^2$, said bearing moves with the head, and of course the hollow hub $d$ within it, and carrying the rotary rests $d^2$, moves with the said head and bearing. The shaft and the sleeve $B^3$, carrying the cutter, have no lateral movement—that is, no movement in a direction at a right angle to the axis of the shaft—and consequently when the nut $g$ is turned on the fixed screw the head $A^4$, bearing $e$, and rests $d^2$ are moved crosswise with relation to the fixed center of motion of the shaft B and sleeve $B^3$ and the pins, which results in adjusting the rests $d^2$ with relation to the blades of the cutter, the pin $f$ acting at all times as the connecting device between the shaft B and the rest to rotate it with the said shaft.

Viewing Fig. 9, showing a horizontal section of the squared end of the sleeve and the rest and its bearing $e$, the latter being fixed to the head $A^4$, (not shown in said figure,) let it be supposed that the diameter of the cutter is substantially as when first made and that the head containing the rest $m$ is in substantially its farthest position to the right from the center of rotation of the cutter-shaft. In the rotation of the shaft B the pin $f$, the end of which rotates in a path concentric with the center of the shaft, slides somewhat out and in the hole in the shank $d$ of the rest, the difference of position of said pin in said slot at opposite portions of the shaft being designated in said figure.

Fig. 10 shows the parts in the position they will occupy when the head $A^4$ (not shown in said figure) is adjusted to the left, as it will be as the blades of the cutter are reduced in length by grinding, and in said figure the pin $f$ is shown as sliding out and into the opening of the shank $d$ to its fullest extent. The end of the pin $f$, (shown at the left by full lines,) is represented as drawn a little farther to the right in the hole in the shank, owing to the fact that the center of rotation of said sleeve is eccentric to the center of rotation of the shaft carrying the said pin, and the dotted lines, Fig. 10, show the pin entered to its fullest extent in said hole.

In practice it will be understood that the extent to which the head $A^4$ is adjusted is but a fraction of an inch.

Having described my invention, what I claim as new, and desire to secure by Letters Patent, is—

1. For heel-trimming, a rotary cutter and rand-guide, having coöperating with them an independent rotary rest disconnected from said rand-guide and presenting a series of projections occupying the spaces between the blades of the cutter, to form a rest for the edge of the sole, the rand-guide and rest being movable one toward and from the other to adapt the cutter to trim heels of different heights, substantially as described.

2. A rotary cutter, a rand-guide, and a rotating rest, substantially as described, for the edge of the sole, combined with a feather-edger device located at one side of said rest to contact with the corner of the sole near its edge as the heel is being trimmed, substantially as set forth.

3. A rotary cutter, a slotted sleeve to which it is attached, a shaft on which said sleeve is mounted a rotary rest having a series of projections entering the spaces between the blades of the cutter, a bearing for the hub of the said rest, and means to connect the said hub and shaft through the said sleeve to thus drive the said rest in unison with the cutter, substantially as described.

4. A slotted sleeve provided with a rotary cutter, a rand-guide, and a rotating rest having projections entering the spaces between the blades of the said cutter, combined with an auxiliary guide presenting a guiding edge to coöperate with said rest in controlling the presenting of the heel to the cutter, substantially as described.

5. A rotary cutter and attached rand-guide, and a rotating edge-rest having projections entering the spaces between the blades of the said cutter, combined with two auxiliary guides, one at each side of the said rotary cutter, and presenting guiding edges in line with said rotating rest, to operate, substantially as described.

6. In a heel-trimming machine, a rotating sleeve and a rotary cutter, and a rand-guide attached thereto, a rotating feather-edger, and a rest, presenting arms inserted between the blades of the cutter, a rotating shaft as B, and connections between it and said sleeve, to enable the said sleeve with its attached cutter and the rand-guide to slide to and from the feather-edger and rest according to variation in thickness of heel, combined with a stationary sole-support occupying a position at one side of said cutter in a plane at an angle to the vertical plane in which the cutter rotates, and means to adjust and then fix the said support in its adjusted position, whereby said support may be inclined more or less according to the inclination desired for the edge of the heel, substantially as described.

7. A rotary cutter, its rand-guide, a sleeve carrying said cutter and said guide, a rotating rest having projections to enter the spaces between the blades of said cutter, combined with a spring-held plate or finger acting on the said rand-guide and normally keeping it and the cutter in position to trim the heel of average thickness, letting the said rand-guide and cutter move, however, in unison to adapt themselves to the increasing thickness of the heel, substantially as described.

8. A rotary cutter, its rand-guide, a sleeve carrying said cutter and said guide, a rotating rest having projections to enter the spaces between the blades of said cutter, and a spring-held plate or finger acting on the said rand-guide and normally keeping it and the cutter in position to trim a heel of average thickness, letting the said rand-guide and cutter move, however, in unison to adapt themselves to the increasing thickness of the heel, combined with an adjusting device coöperating with said finger to adapt it to changes in width of cutter used, substantially as described.

9. In a heel-trimming machine, a head, a bearing *e* connected therewith, a rotating rest mounted in said bearing, a rotating sleeve extending through said rest and having an attached cutter, the projections of the said rest entering the spaces between the blades of the said cutter, and a hollow box $A^3$, combined with an adjusting device composed of a screw attached to one end of said hollow box, and a nut held loosely in a yoke carried by said head and fitting the threads of said screw, the rotation of said nut adjusting the said head, the bearing and the rest, substantially as described.

10. For heel-trimming, a rotary cutter and rand-guide having coöperating with them a rotating rest presenting a series of projections occupying only the rear parts of the spaces between the blades of the cutter, the rand-guide and cutter being freely movable together longitudinally of the axis of rotation of the cutter to expose more or less of the cutting edges of the cutter and thus adapt it to trim heels of different heights, substantially as described.

11. In a heel-trimming machine, a rotating shaft; and a rotating cutter and rand-guide movable together longitudinally of the axis of rotation of the cutter, to thereby enable the cutter to trim heels of different thickness; combined with a sole-support held stationary during the operation of trimming a heel, substantially as described.

12. In a heel-trimming machine, a rotary cutter movable longitudinally of its axis of rotation and a coöperating rand-guide, combined with a sole-support made as a flat table, and auxiliary supporting means for guiding the edge of the sole located near one edge of said table, the face of said support occupying a position at one side of said cutter in a plane at an angle to the axis of rotation of the cutter, and means to hold said support stationary throughout the operation of trimming a heel, substantially as described.

13. In a heel-trimming machine, the following instrumentalities, viz: a rotating shaft; and a rotating cutter and rand-guide movable together longitudinally of the axis of rotation of the cutter to thereby adapt them to trim heels of different thickness; combined with a sole-support held stationary during the operation of trimming a heel; and a rotary rest $d^2$, it also occupying a defined position with relation to the said stationary sole-support during said heel-trimming operation, substantially as described.

14. In a heel-trimming machine, a sole-support in combination with a rand-guide and a rotary cutter yieldingly supported so as to be movable to and from the sole-support to expose more or less of the cutting edges of the cutter for trimming heels of varying thickness, substantially as described.

15. In a heel-trimming machine, a rand-guide and a rotary cutter movable longitudinally of the axis of rotation of the cutter, in combination with a guide for the edge of the sole upon which the latter is supported adjacent to the point at which the trimming is taking place to assist in governing the depth of the cut, substantially as described.

16. In a heel-trimming machine, a sole-support, a rand-guide, and a rotary cutter yieldingly supported so as to move to and from the sole-support to expose more or less of the cutting edges of the cutter for trimming heels of varying thickness, in combination with a guide for the edge of the sole upon which the latter is supported adjacent to the point at which the trimming is taking place to assist in governing the depth of the cut, substantially as described.

17. In a heel-trimming machine, the following instrumentalities, viz: a stationary sole-support, a rotatable cutter to trim the heel, a rand-guide connected therewith and adapted to run in the rand-crease, said guide being freely movable toward and from said support and taking the cutter with it as the heel varies in thickness, substantially as described.

18. In a heel-trimming machine, the following instrumentalities, viz: a stationary sole-support, a rotatable cutter to trim the heel, a rand-guide connected therewith and adapted to run in the rand-crease, said guide being freely movable toward and from said support and taking the cutter with it as the heel varies in thickness, and a spring to control automatically the position of the rand-guide and connected cutter with relation to said support as the heel being trimmed varies in thickness, substantially as described.

19. In a heel-trimming machine, the following instrumentalities, viz: a stationary sole-support, a rotatable cutter to trim the heel, a rand-guide connected therewith and running in the rand-crease, said guide being freely movable toward and from said support and taking the cutter with it as the heel varies in thickness, and means to adjust said support to change the position of its face with relation to the center or axis of rotation of the said cutter, to vary thereby the inclination of the heel between its tread-face and the rand-crease, substantially as described.

20. In a heel-trimming machine a rand-guide and a rotary cutter freely movable longitudinally of the axis of rotation of the cutter to trim a heel of varying thickness, substantially as described.

21. In a heel-trimming machine a sole-support in combination with a rand-guide and a rotary cutter freely movable longitudinally of the axis of rotation of the cutter to trim a heel of varying thickness, substantially as described.

22. In a heel-trimming machine a rand-guide and a rotary cutter movable longitudinally of the axis of rotation of the cutter in combination with a guide for the edge of the sole, located outside of the path of the cutter, upon which the sole is supported adjacent to the point at which the trimming is taking place to assist in governing the depth of the cut, substantially as described.

23. In a heel-trimming machine a rand-guide and a rotary cutter movable longitudinally of the axis of rotation of the cutter by the positioning of the work, in combination with a rotary rest, substantially as described.

BENJAMIN F. MAYO.

Witnesses:

EDWARD F. ALLEN,

THOMAS J. DRUMMOND.